Patented Nov. 14, 1939

2,179,982

UNITED STATES PATENT OFFICE 2,179,982

ZIRCONIA ZIRCON SILICON REFRACTORY

John D. Morgan, South Orange, N. J., assignor to Power Patents Company, Hillside, N. J., a corporation of Maine No Drawing. Application March 17, 1937, Serial No. 131,456

3 Claims. (Cl. 106—9)

The present invention relates to high temperature resistant bonded refractories, and more particularly to an improved zirconia-silicon refractory and process of making the same.

Refractories made of zirconia and zircon bonded together with phosphoric acid are disclosed in my United States Patent No. 1,809,249. Refractories made of zircon and silicon bonded together with phosphoric acid are disclosed in the United States patent of John D. Morgan, W. G. Bjordstedt and R. E. Lowe, No. 1,811,242. The herein described invention is an improvement on such refractories.

The primary object of the present invention is to provide a high temperature resistant refractory which is chemically basic and which possesses high electrical resistance, high thermal-conductivity, and a small co-efficient of thermal expansion or contraction in use.

With the above and other objects and features in view, the invention is hereinafter described and particularly defined by the accompanying claims.

A composition of the aggregate which is employed in forming the refractory of the present invention is substantially as follows:

16–66 parts of zirconia, crushed to pass through a 200 mesh screen; 2–8 parts of zircon, crushed to pass through a 200 mesh screen; 76–20 parts of 75% ferro-silicon, about 70% of which is crushed to pass through a 10 mesh and remain on a 20 mesh screen, while 15% is crushed to pass through a 20 mesh screen and remain on a 40 mesh screen, and 15% is crushed to pass through a 40 mesh screen and remain on a 60 mesh screen. As a bonding agent, about 3–9 parts (average 6 parts) by weight of 85% orthophosphoric acid is employed.

According to the preferred method of making the refractory, there is obtained a thoroughly bonded and dense high temperature resistant refractory having a high electrical resistance, a high melting point, a high thermal-conductivity, a small co-efficient of thermal expansion or contraction at high temperatures, and which is sufficiently basic to resist chemical attack when employed in contact with basic slags or in basic atmospheres.

Zirconia is known for its highly refractory properties, but its use is limited by reason of its high shrinkage when used under furnace conditions. This shrinkage characteristic of zirconia at high temperature is apparent even when the zirconia has been electrically fused and reground. Pure metallic silicon possesses a co-efficient of heat conductivity of $\frac{2}{10}$th's calories per centimeter per second per degree C. The conductivity of high grade ferro-silicon is only slightly less than that of pure silicon. Metallic silicon and high grade ferro-silicon, however, are subject to chemical attack at high temperatures, and are not therefore adapted for use as such in high temperature furnace construction. Another disadvantage of metallic silicon and ferro-silicon is that both of these materials swell when subjected to continuous heating at high temperatures. The mineral zircon is a very efficient heat insulator, and possesses a low co-efficient of expansion per degree of change in temperature. While the high shrinkage characteristics of zirconia can be balanced to some extent by mixing therewith silicon or ferro-silicon, which expand with heat, it has been found that a strong bond between these materials can not be obtained simply by bonding agents such as phosphoric acid alone. The refractory of the present invention is based in part on the discovery that a suitable bond between zirconia and silicon or ferro-silicon is only obtainable by employing a refractory, as distinguished from a metallic, bonding medium, the preferred bonding agent being zircon phosphate produced by reaction between about equal proportions of mineral zircon and phosphoric acid.

An example of the preferred method of making the refractory which forms the substance of the present invention will now be described:

Zirconia is crushed and finely ground so that the material will pass through a 200 mesh screen. Native zircon (zirconium silicate) is also milled to pass through a 200 mesh screen. Ferro-silicon (preferably 75%–85% silicon) is coarsely ground so that about 70% will pass through a 10 mesh screen and be retained on a 20 mesh screen, and so that about 15% will pass through a 20 mesh screen and be retained on a 40 mesh screen, while about 15% will pass through a 40 mesh screen and be retained on a 60 mesh screen. About 40 to 42 parts by weight of the finely divided zirconia is admixed with about 6 parts by weight of the milled grain zircon, and the mixture is wetted with water to a creamy consistency, after which 6 parts by weight of 85% orthophosphate acid is added to the wetted mixture. This mixture is digested for a period of several hours at a temperature in the neighborhood of 200° F., the temperature during the latter part of the digestion period being raised to about 350° F. until the consistency of the mixture has increased to that of a thick paste. The digested zirconia-zirconphosphoric acid paste is then well stirred while undergoing dilution with water to increase its fluidity to a milky consistency. About 48 to 50 parts of the coarsely ground ferro-silicon are now added to the milky partially digested zirconia-zircon-phosphoric acid mixture. The resulting mixture is thoroughly agitated and stirred for a brief period, and is then allowed to digest for several hours at an elevated temperature until the consistency has thickened to a degree suitable for casting. In some cases, the period of digestion is continued until the digested mixture has assumed a solid state. In either case, during the latter part of the digesting period, the mixture is subjected for a short period to a strong vacuum (20 inches or more) and thoroughly evacuated until all signs of gas ebullition from the mixture have ceased. In cases where the mixture is digested to dryness, the solid product of this operation is reground and milled to a suitable size (so that about 20% will pass through an 80 mesh screen) after which the ground product is wetted with water and rehydrated to a molding consistency, i. e., a consistency that will retain its shape when hand molded.

Refractories as prepared above may be cast or molded into various shapes and are particularly adapted for use in the manufacture of furnace linings and brick shapes for use in heat treating furnaces, hearths and the like, and for embedding resistance wire to form a refractory coated electric heating element. The shapes into which the refractory is cast or molded are preferably dried and fired at temperatures approximating those at which the refractory is to be finally used.

The invention having been thus described what I claim as new is:

1. A method of making a bonded refractory which comprises mixing about 16–66 parts by weight of finely crushed zirconia (through 200 mesh) with 2–8 parts by weight of milled grain zircon, wetting the mixture with water and about 6 parts by weight of phosphoric acid to a creamy consistency, reducing the mixture to the consistency of a thick paste by digestion for several hours at a temperature ranging from about 200–350° F., adding water to increase the fluidity of the mixture and thoroughly admixing therewith about 76–20 parts by weight of coarsely ground ferrosilicon (10–60 mesh), digesting the mixture while agitating it and while heat drying the mixture to a suitable consistency for casting and shaping, drying and heat hardening the product.

2. The method of claim 1 in which the heating operation which follows the addition of ferro-silicon to the mixture is continued until the product is dry, after which the product is pulverized and thereafter rehydrated to a suitable consistency for molding.

3. The method of making a high temperature resistant refractory which comprises mixing about 40 parts by weight of finely crushed zirconia with about 6 parts by weight of milled grain zircon, wetting the mixture with water and about 6 parts by weight of phosphoric acid and digesting the mixture for several hours at 200–350° F., while increasing its consistency to that of a thick paste, again wetting the mixture with water and adding thereto about 45–50 parts by weight of coarsely ground ferro-silicon, thoroughly agitating the mixture and shaping, drying and heat hardening the product.

JOHN D. MORGAN.